(12) United States Patent
Lee et al.

(10) Patent No.: US 11,663,816 B2
(45) Date of Patent: May 30, 2023

(54) APPARATUS AND METHOD FOR CLASSIFYING ATTRIBUTE OF IMAGE OBJECT

(71) Applicant: Electronics and Telecommunications Research Institute, Daejeon (KR)

(72) Inventors: Jeun Woo Lee, Gyeryong-si (KR); Sung Chan Oh, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 153 days.

(21) Appl. No.: 17/174,570

(22) Filed: Feb. 12, 2021

(65) Prior Publication Data

US 2021/0256322 A1    Aug. 19, 2021

(30) Foreign Application Priority Data

Feb. 17, 2020 (KR) ........................ 10-2020-0018862

(51) Int. Cl.
| | |
|---|---|
| G06K 9/62 | (2022.01) |
| G06K 9/66 | (2006.01) |
| G06V 10/82 | (2022.01) |
| G06F 18/2413 | (2023.01) |
| G06F 18/22 | (2023.01) |
| G06V 30/19 | (2022.01) |

(52) U.S. Cl.
CPC .............. *G06V 10/82* (2022.01); *G06F 18/22* (2023.01); *G06F 18/24137* (2023.01); *G06V 30/19173* (2022.01)

(58) Field of Classification Search
CPC ... G06K 9/6272; G06K 9/6215; G06V 30/194
See application file for complete search history.

(56) References Cited

U.S. PATENT DOCUMENTS

| | | | |
|---|---|---|---|
| 9,971,953 | B2 | 5/2018 | Li et al. |
| 2002/0078044 | A1 | 6/2002 | Song et al. |
| 2012/0237126 | A1 | 9/2012 | Choi et al. |
| 2014/0270495 | A1* | 9/2014 | Tu ........................ G06K 9/6259 382/160 |
| 2018/0276727 | A1 | 9/2018 | Patel et al. |
| 2020/0019811 | A1 | 1/2020 | Kim et al. |
| 2021/0142168 | A1* | 5/2021 | Kushnir ................ G06N 3/063 |

FOREIGN PATENT DOCUMENTS

| | | |
|---|---|---|
| JP | 2009-282686 | 12/2009 |
| KR | 10-2018-0025093 | 3/2018 |
| KR | 10-2019-0096295 | 8/2019 |
| KR | 10-2019-0103098 | 9/2019 |

* cited by examiner

*Primary Examiner* — David F Dunphy
(74) *Attorney, Agent, or Firm* — Kile Park Reed & Houtteman PLLC

(57) ABSTRACT

Provided is an apparatus for classifying an attribute of an image object, including: a first memory configured to store target object images that are indexed; a second memory configured to store target object images that are un-indexed; and an object attribute classification module configured to perform learning on the un-indexed target object images to construct a classifier for classifying a detailed attribute of target object, and finely adjust the classifier on the basis of the indexed target object images.

18 Claims, 11 Drawing Sheets

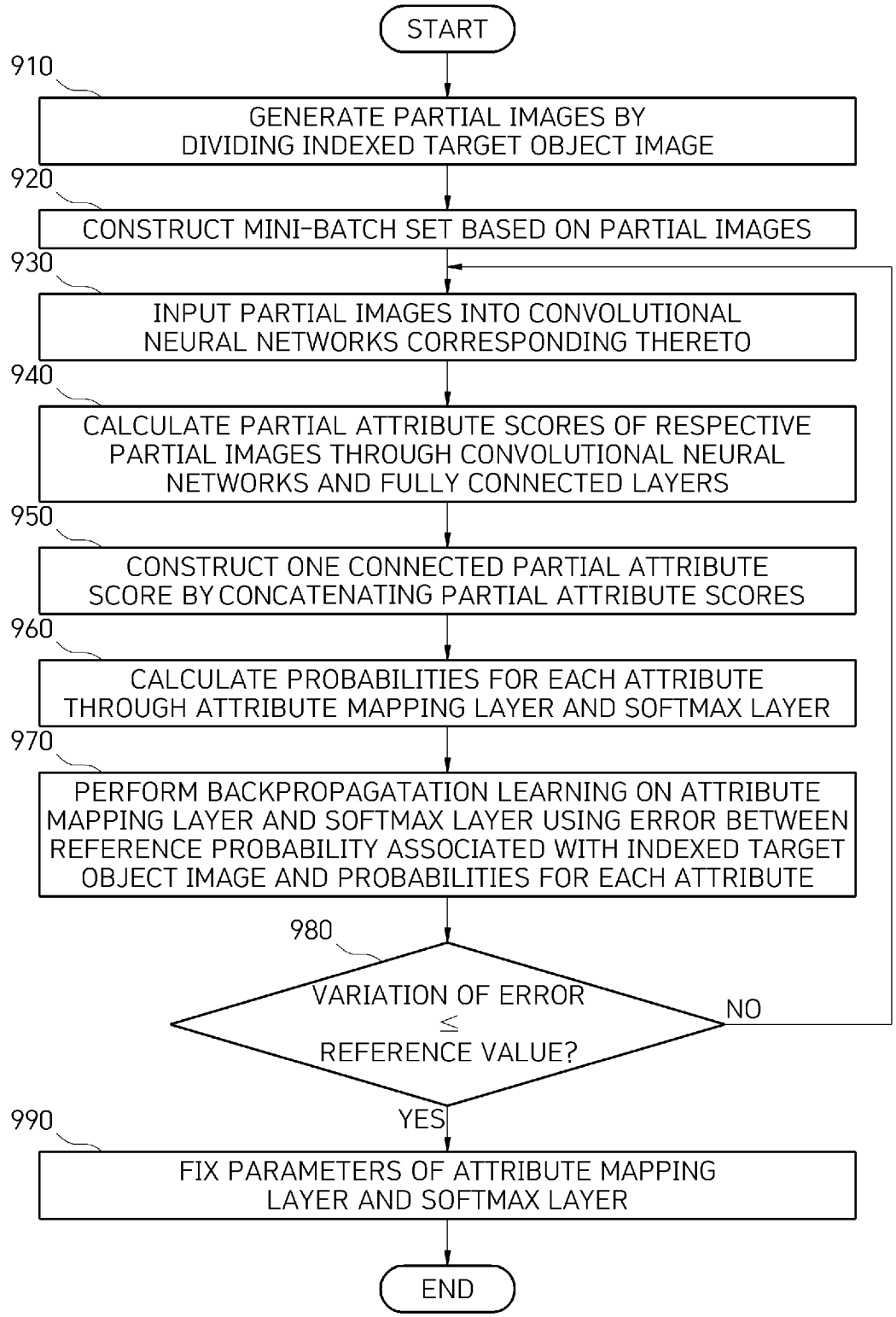

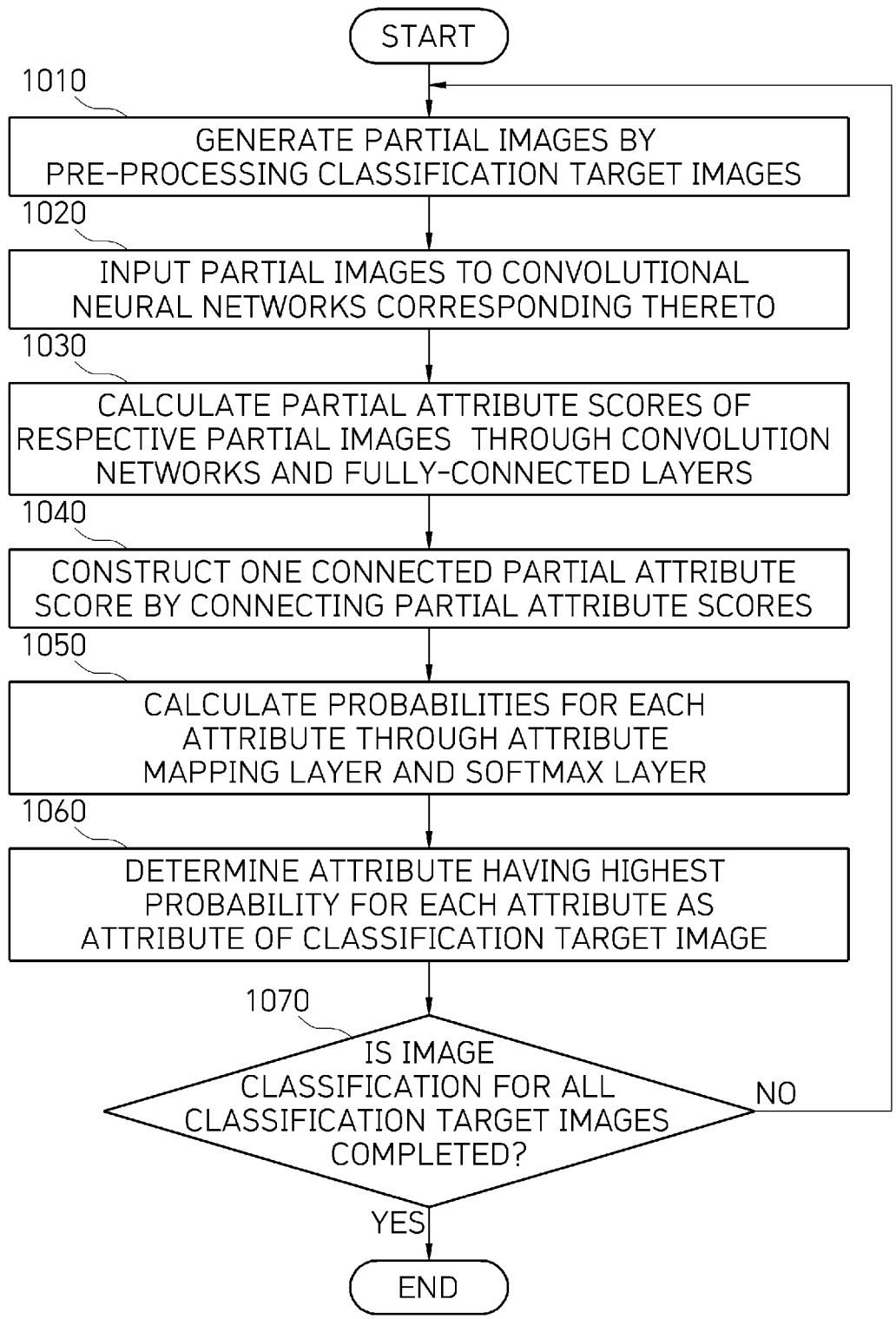

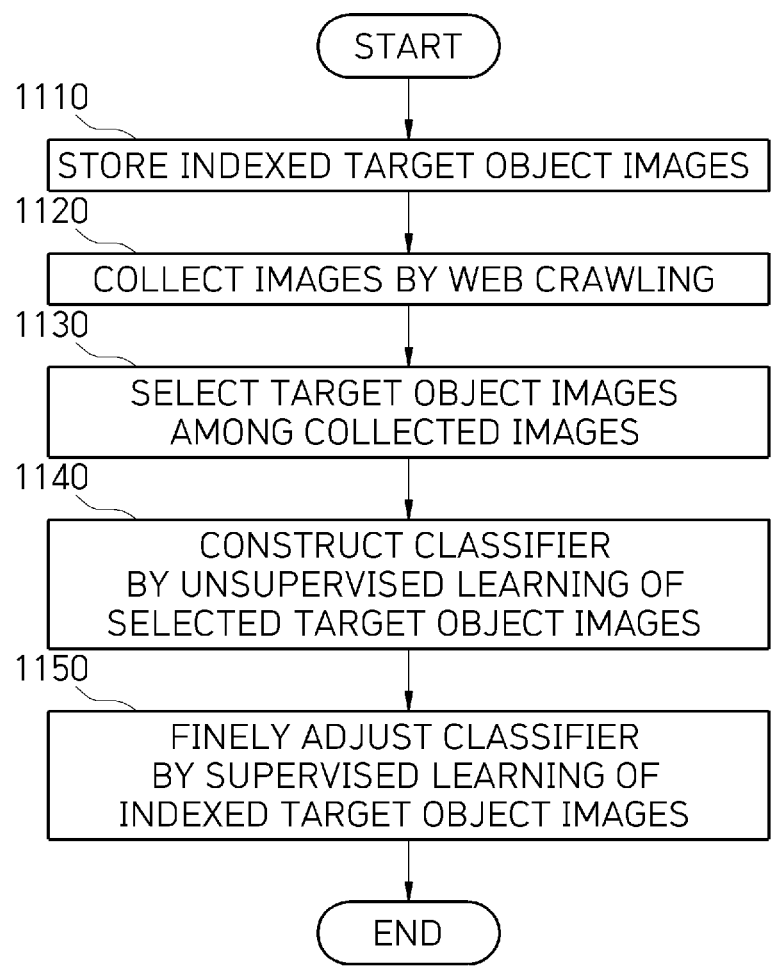

APPARATUS AND METHOD FOR CLASSIFYING ATTRIBUTE OF IMAGE OBJECT

CROSS-REFERENCE TO RELATED APPLICATION

This application claims priority to and the benefit of Korean Patent Application No. 10-2020-0018862, filed on Feb. 17, 2020, the disclosure of which is incorporated herein by reference in its entirety.

BACKGROUND

1. Field of the Invention

Embodiments of the disclosure relate to a machine learning-based image object classification technology.

2. Discussion of Related Art

Deep learning technology may be used to classify objects included in images, such as humans, dogs, and vehicles. Deep learning-based classification technology is regarded as having performance comparable to human capabilities.

Recently, there have been attempts to use deep learning technology for more precise classification, such as fine classification of attributes of objects. For example, there have been disclosed technologies of classifying detailed attributes such as types, shapes, and decorations of clothing items.

SUMMARY OF THE INVENTION

The conventional deep learning-based objects/attribute classification system requires a large amount of indexed (or labeled) data for learning. Therefore, the conventional deep learning-based object/attribute classification system may take a great deal of time and effort to prepare learning data. Moreover, since detailed and elaborated classification of features requires a larger amount of training data and an index worker with expertise, preparing training data may become more difficult.

In addition, pre-trained public convolutional neural networks are limited in the size of images to be processed and thus are not easily used for high-resolution image-based attribute classification which is required for detailed analysis of each part in an image.

Various embodiments of the disclosure may provide an apparatus and method for classifying an attribute of an image object which are capable of constructing a classifier for classifying an attribute of an image object on the basis of a small amount of indexed data while using a pre-trained public convolutional neural network structure.

The technical objectives of the present invention are not limited to the above, and other objectives may become apparent to those of ordinary skill in the art based on the following description.

According to one aspect of the present invention, there is provided an apparatus for classifying an attribute of an image object, including a first memory configured to store target object images that are indexed, a second memory configured to store target object images that are un-indexed, and an object attribute classification module configured to perform learning on the un-indexed target object images to construct a classifier for classifying a detailed attribute of the target object, and finely adjust the classifier on the basis of the indexed target object images.

According to another aspect of the present invention, there is provided an apparatus for classifying an attribute of an image object, including: a memory configured to store at least one instruction; and a processor, wherein the processor is configured to execute the at least one instruction to perform unsupervised learning on target object images, which are un-indexed, to construct a classifier for classifying a detailed attribute of the target object image; and finely adjust the classifier on the basis of target object images which are indexed.

According to another aspect of the present invention, there is provided a method of classifying an attribute of an image object, comprising storing target object images that are indexed, storing target object images that are un-indexed, performing un-supervised learning on the un-indexed target object images to construct a classifier for classifying a detailed attribute of the target object image, and performing supervised learning on the indexed target object images to finely adjust the classifier.

The above-described configurations and operations of the present invention will become more apparent from embodiments described in detail below with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 9 shows a detailed fine-adjustment method by the object attribute classification module according to another embodiment of the present invention;

FIG. 10 illustrates an object attribute classification method by the object attribute classification module according to another embodiment of the present invention; and FIG. 11 illustrates an object attribute classification method according to an embodiment.

DETAILED DESCRIPTION OF EXEMPLARY EMBODIMENTS

Figure 1:
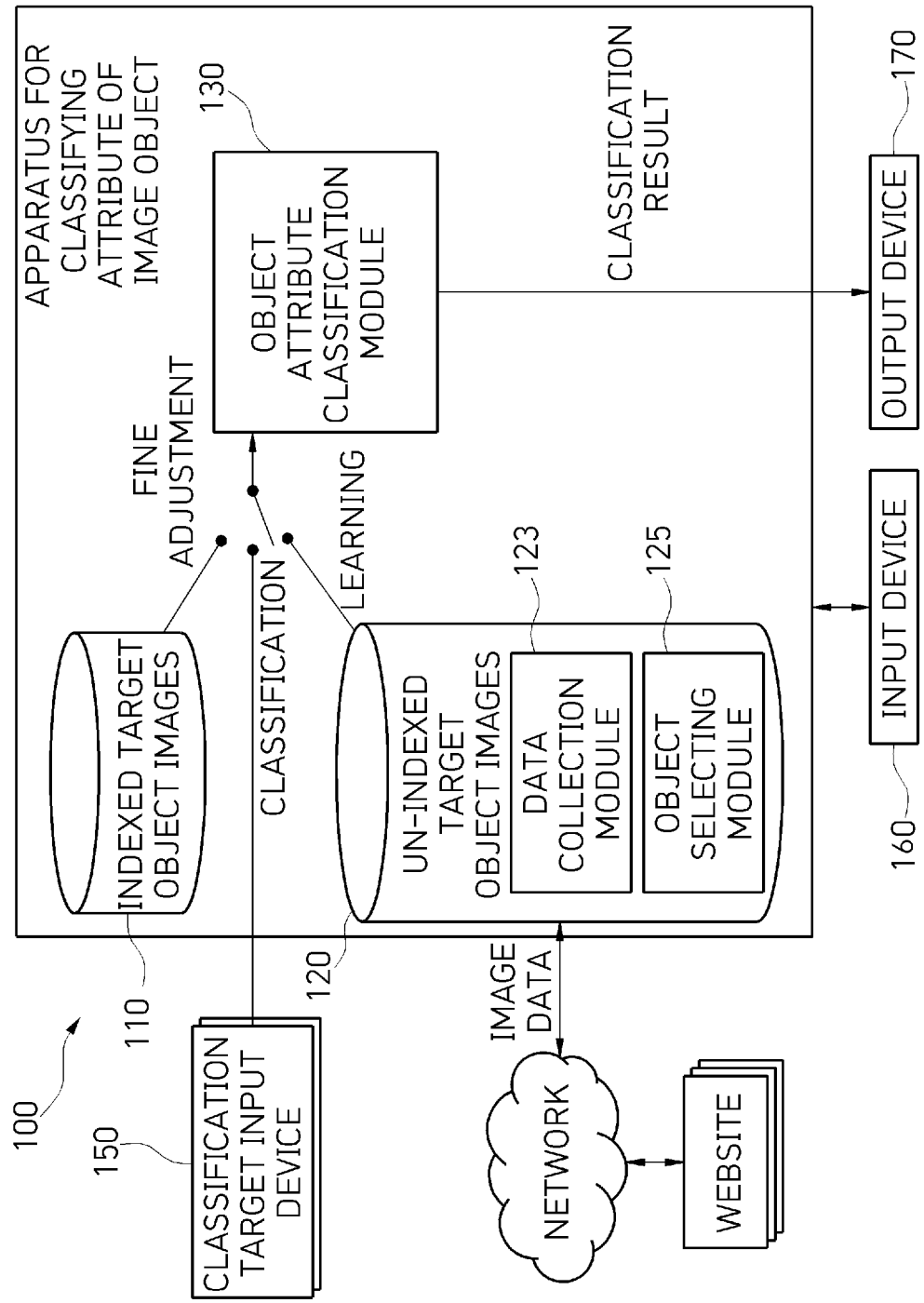
FIG. 1 is a block diagram illustrating an apparatus for classifying an attribute of an image object according to an embodiment.

In connection with the description of the drawings, the same or similar reference numerals may be used for the same or similar components.

FIG. 1 is a block diagram illustrating an apparatus for classifying an attribute of an image object according to an embodiment.

Referring to FIG. 1, an apparatus 100 for classifying an attribute of an image object according to the embodiment may include a first memory 110, a second memory 120, and an object attribute classification module 130. In an embodiment, some components may be omitted from or added to the apparatus 100 for classifying an attribute of an image object described in FIG. 1. For example, the apparatus 100 for classifying an attribute of an image object may further include at least one of an input device 160, a classification target input device 150, and an output device 170. In addition, some of the components of the apparatus 100 for classifying an attribute of an image object may be combined into a single object while performing the functions thereof before the combination. Alternatively, the apparatus 100 for classifying an attribute of an image object may include a plurality of devices. For example, the apparatus 100 for classifying an attribute of an image object may include a database server including the first memory 110 and a processing server including the second memory 120.

The first memory 110 may store various types of data used by at least one component (e.g., the processor) of the apparatus 100 for classifying an attribute of an image object. Data may include, for example, software and input data or output data regarding instructions associated with the software. The first memory 110 may include a volatile memory or a nonvolatile memory. The second memory 120 may be a hard disk, a solid-state drive (SSD), or an external storage server. The second memory 120 may store at least one instruction for classifying an attribute of an image object. The first memory 110 may store indexed (or labeled) target object images. The indexed target object images may be reference target object images to which attributes (detailed attributes) of a target object included in each target object image are mapped.

The second memory 120 may include a data collection module 123, an object selecting module 125, and an object attribute classification module 130. The second memory 120 may include a volatile memory or a nonvolatile memory. The second memory 120 may be a hard disk, an SSD, or an external storage server.

According to the embodiment, the data collection module 123 may collect images for learning by web-crawling a designated web site. The data collection module 123 may store the collected images in the second memory 120. The object selecting module 125 may select target object images including a target object among the collected images on the basis of feature vectors of the collected images. For example, the object selecting module 125 may select target object images on the basis of the similarity between the indexed target object images and the collected images. The object selecting module 125 may store the target object images selected from the collected images in the second memory 120.

The images (e.g., target object images) stored in the first memory 110 or the second memory 120 may be image data (e.g., jpeg image files) capable of generating an image to be displayed on a display. However, for the sake of convenience in description, in this document, an image and image data are not distinguished from each other and described as an image. According to various embodiments, the first memory 110 and the second memory 120 may be integrated into one memory or may be separated into a plurality of memories.

The input device 160 may include at least one of a mouse, a keyboard, and a touch screen. The input device 160 may detect or receive a user input.

The classification target input device 150 may include an external memory that stores classification target images.

The output device 170 may include at least one device selected from a display and a speaker and may output a classification result. According to the embodiment, the data collection module 123, the object selecting module 125, and the object attribute classification module 130 may be provided as software modules or hardware modules that are executed by at least one processor. The at least one processor may execute at least one instruction to control at least another component (e.g., hardware or software components) of the apparatus 100 for classifying an attribute of an image object and perform various data processing or operations. The processor may include, for example, at least one of a central processing unit (CPU), a graphics processing unit (GPU), a microprocessor, an application processor, an application specific integrated circuit (ASIC), and a field programmable gate array (FPGA), and may have a plurality of cores.

According to the embodiment, the object attribute classification module 130 may construct a classifier capable of classifying detailed attributes of selected target object images by performing unsupervised learning on target object images, which are not indexed, on the basis of deep learning. In this process, the object attribute classification module 130 may perform learning on the target object images to cluster and classify similar feature vectors. In addition, the object attribute classification module 130 may finely adjust the constructed classifier by performing supervised learning on indexed target object images. In this process, the object attribute classification module 130 may perform learning on the indexed target object images to assign accurate attribute names (indexes) to the clusters classified as the above.

According to the embodiment, upon obtaining classification target images from the classification target input device 150 on the basis of a user input of the input device 160, the object attribute classification module 130 may classify an attribute of a target object included in the classification target images on the basis of the classifier. The object attribute classification module 130 may output the classification result through the output device 170.

According to the above-described embodiment, the apparatus 100 for classifying an attribute of an image object may implement the classifier composed of a large-scale neural network capable of classifying detailed attributes of an object on the basis of a small amount of indexed target object images and a large amount of un-indexed data (collected images). Accordingly, the apparatus 100 for classifying an attribute of an image object may improve the conventional limitation in which a large amount of resources and high costs are required for generating training data due to requiring a large amount of indexed training data when implementing an object attribute classifier.

Figure 2:
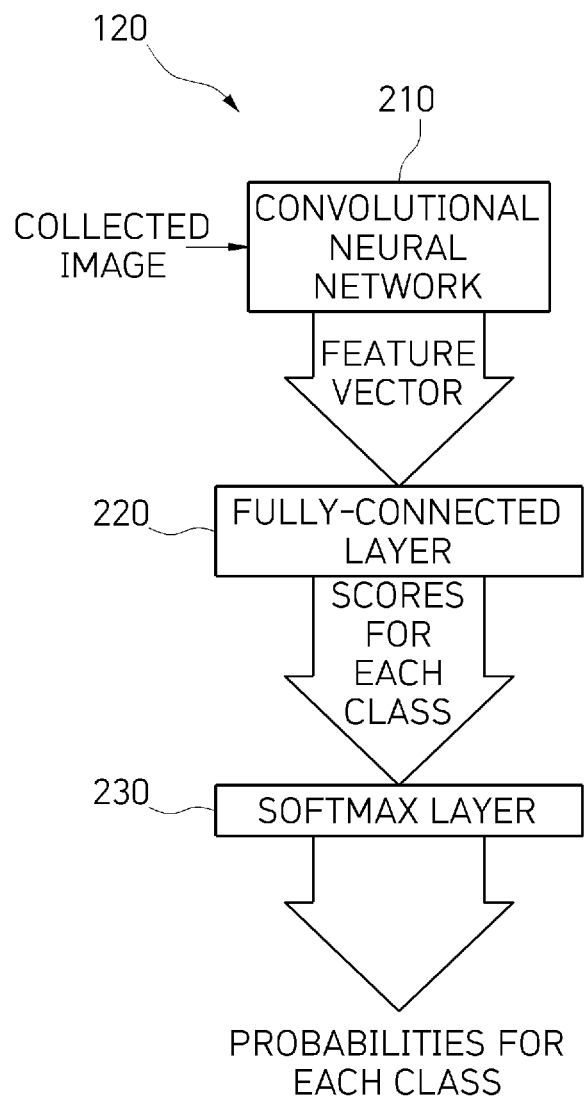
FIG. 2 is a block diagram illustrating an object selecting module according to an embodiment.

FIG. 2 is a block diagram illustrating the object selecting module according to the embodiment.

Referring to FIG. 2, the object selecting module 125 according to the embodiment may include a convolutional neural network 210, a fully connected layer 220, and a SoftMax layer 230.

The convolutional neural network 210 may calculate feature vectors of collected images through a convolution operation.

The fully connected layer 220 may map the calculated feature vectors to scores for each class. The fully connected layer 220 may be, for example, a three-layer fully connected neural network.

The SoftMax layer 230 may map the scores for each class to probabilities (a probability vector) for each class.

The object selecting module 125 may classify (or discriminate) target object images from other images among the collected images on the basis of the probabilities for each class.

The object selecting module 125 according to the embodiment may be implemented by transfer learning using a pre-structured neural network (VGG16 or ResNet) configured by learning from ImageNet data, thereby saving resources required for neural network learning due to using a pre-trained public convolutional neural network.

Figure 3:
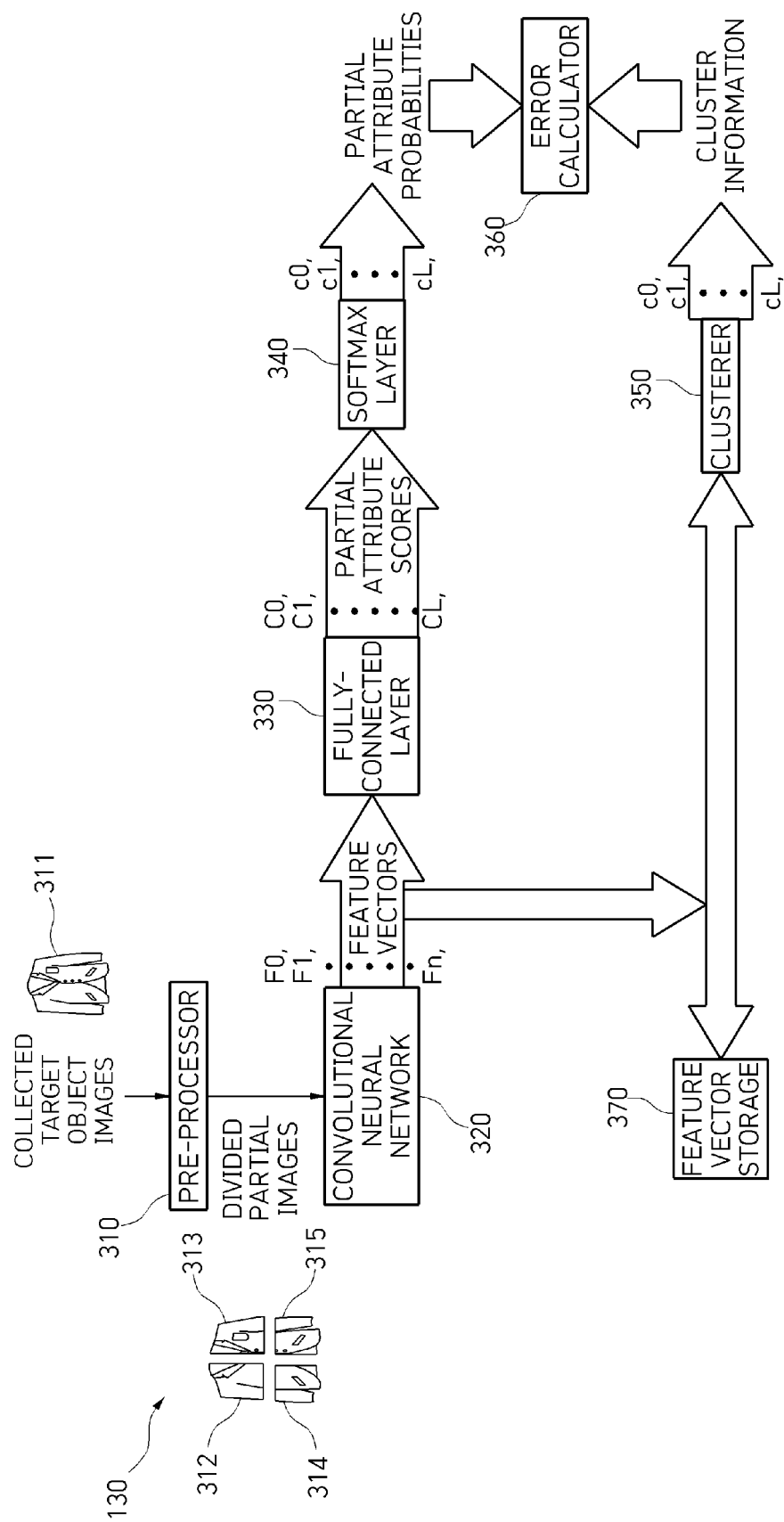
FIG. 3 is a block diagram illustrating an object attribute classification module in a learning operation according to an embodiment.

FIG. 3 is a block diagram illustrating the object attribute classification module in a learning operation according to an embodiment.

Referring to FIG. 3, the object attribute classification module 130 according to the embodiment includes a pre-processor 310, a convolutional neural network 320, a fully-connected layer 330, a SoftMax layer 340, a clusterer 350, an error calculator 360, and a feature vector storage 370.

The pre-processor 310 may convert the target object images to have a designated resolution (or a designated size) required for attribute classification of an object. The pre-processor 310 may generate a plurality of partial images 312 to 315 on the basis of each of the converted target object images 311 to accord with an input requirement of the pre-trained public convolutional neural network. For example, the pre-processor 310 may divide each of the target object images 311 into quarters to generate an upper left area image 312, an upper right area image 313, a lower left area image 314, and a lower right area image 315. According to various embodiments, the pre-processor 310 may divide each of the target object images into a different number of equal parts (e.g., into divisions less than or equal to three or greater than or equal to five). As the image is divided in this way, the amount of training data may increase by the multiple of the divider. In this document, for the sake of convenience of description, a case in which the pre-processor 310 divides each target object image into quarters will be described as an example.

The convolutional neural network 320 may receive a plurality of partial images output from the pre-processor 310 and calculate feature vectors of the plurality of partial images through a convolution operation. The convolutional neural network 320 may be implemented by learning only using a convolutional neural network part in a pre-structured neural network (e.g., VGG16 or ResNet) configured by learning from ImageNet data. The calculated feature vectors may be stored in the feature vector storage 370.

The clusterer 350 may cluster feature vectors of the plurality of partial images (hereinafter referred to as "all partial images") corresponding to all the selected target object images to generate a plurality of clusters. The number of clusters L may be set to exceed the number k of attributes to be classified by about ten times. For example, the clusterer 350 may generate L clusters corresponding to ten times the number k of attributes to be classified from the feature vectors. The clusterer 350 may calculate cluster centers for the plurality of clusters.

The clusterer 350 may calculate cluster information on the basis of feature vectors of some partial images (hereinafter, referred to as "a mini-batch set") among all the partial images. The cluster information may be a vector generated through one-hot encoding. For example, the clusterer 350 may calculate the cluster information on the basis of the calculated cluster center.

The fully-connected layer 330 may map the feature vectors of the partial images into a partial attribute score vector. The fully-connected layer 330 may be a three-layer fully-connected neural network.

The SoftMax layer 340 may map the partial attribute score vector to a partial attribute probability vector.

The error calculator 360 may calculate a difference between the partial attribute probability vector and the cluster information corresponding to the some partial images. The difference may be used for learning the convolutional neural network 320, the fully-connected layer 330, and the SoftMax layer 340 on the basis of a backpropagation algorithm (hereinafter, referred to as "backpropagation learning"). Hereinafter, a learning operation of the object attribute classification module 130 according to the embodiment will be described in detail with reference to FIG. 4.

Figure 4:
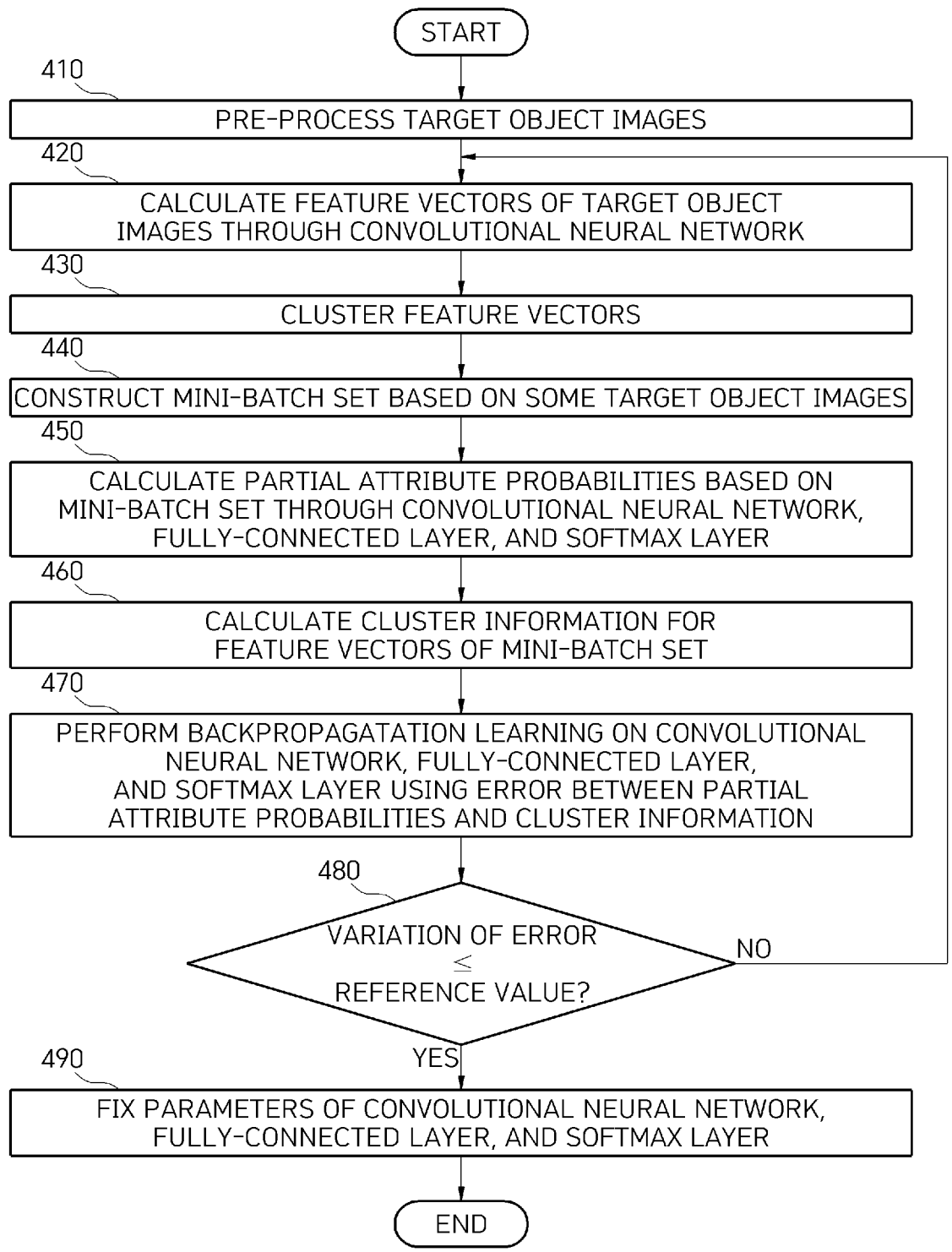
FIG. 4 illustrates a learning method by an object attribute classification module according to an embodiment.

FIG. 4 illustrates a learning method of the object attribute classification module according to an embodiment.

Referring to FIG. 4, in operation 410, the object attribute classification module 130 may generate a plurality of partial images by performing resolution conversion and division on target object images. For example, the pre-processor 310 may construct 4N partial images by dividing N target object images into quarters.

In operation 420, the object attribute classification module 130 may calculate feature vectors of the plurality of partial images through the convolutional neural network 320. The object attribute classification module 130 may store the calculated feature vectors in the feature vector storage 370. The object attribute classification module 130 may calculate feature vectors of the plurality of partial images (hereinafter, "all partial images") corresponding to all of the selected target object images.

In operation 430, the object attribute classification module 130 may obtain the feature vectors of a plurality of partial images (hereinafter referred to as "all the partial images") from the feature vector storage 370, and cluster the obtained feature vectors through the clusterer 350 to generate L clusters. The object attribute classification module 130 may calculate cluster information expressed as L one-hot vectors on the basis of the L clusters through the clusterer 350. In addition, the object attribute classification module 130 may calculate a cluster center on the basis of the calculated cluster information. In this regard, the clusterer 350 may perform the clustering after feature vectors corresponding to all the selected target object images are calculated and the calculated feature vectors are stored in the feature vector storage 370.

In operation 440, the object attribute classification module 130 may construct a mini-batch set on the basis of some partial images among the plurality of partial images. For example, the object attribute classification module 130 may construct arbitrary some partial images among all the partial images as a mini batch set.

In operation 450, the object attribute classification module 130 may calculate the partial attribute probabilities for the mini-batch set through the convolutional neural network 320, the fully-connected layer 330, and the SoftMax layer 340.

In operation 460, the object attribute classification module 130 may calculate cluster information for feature vectors of the mini-batch set on the basis of the cluster center. The cluster information may be vector information representing the L clusters. For example, the cluster information may be a one-hot vector in which only a value corresponding to a cluster to which the partial image belongs is expressed as 1 and values corresponding to the remaining clusters are expressed as 0.

In operation 470, the object attribute classification module 130 may perform backpropagate learning on the convolutional neural network 320, the fully-connected layer 330, and the SoftMax layer 340 on the basis of an error between the partial attribute probabilities and the cluster information. For example, the object attribute classification module 130 may calculate a difference between the partial attribute probabilities and the cluster information through the error calculator 360 as an error. The object attribute classification module 130 may perform backpropagation learning through the convolutional neural network 320, the fully-connected layer 330, and the SoftMax layer 340 on the basis of the error.

In operation 480, the object attribute classification module 130 may check a variation of the error of the mini-batch set and check whether the variation of the error is less than a reference value.

The object attribute classification module 130, upon determining in operation 480 that the variation of the error is less than or equal to the reference value, may fix parameters of the convolutional neural network 320, the fully-connected layer 330, and the SoftMax layer 340 in operation 490. The fixed convolutional neural network 320, the fully-connected layer 330, and the SoftMax layer 340 may correspond to the classifier for classifying an attribute of a target object.

Upon determining in operation 480 that the variation of the error exceeds the reference value, the object attribute classification module 130 may return to operation 420 and perform subsequent operations again.

According to the above-described embodiment, the object attribute classification module 130 may construct the convolutional neural network 320, the fully-connected layer 330, and the SoftMax layer on the basis of images (partial images) obtained by dividing selected target object images so that the classifier may be executed on the basis of a larger amount of training data (selected target object images) compared to collected images.

In addition, according to the above-described embodiment, the object attribute classification module 130 may construct the classifier by performing unsupervised learning using cluster information on the selected target object images as a reference vector.

Figure 5:
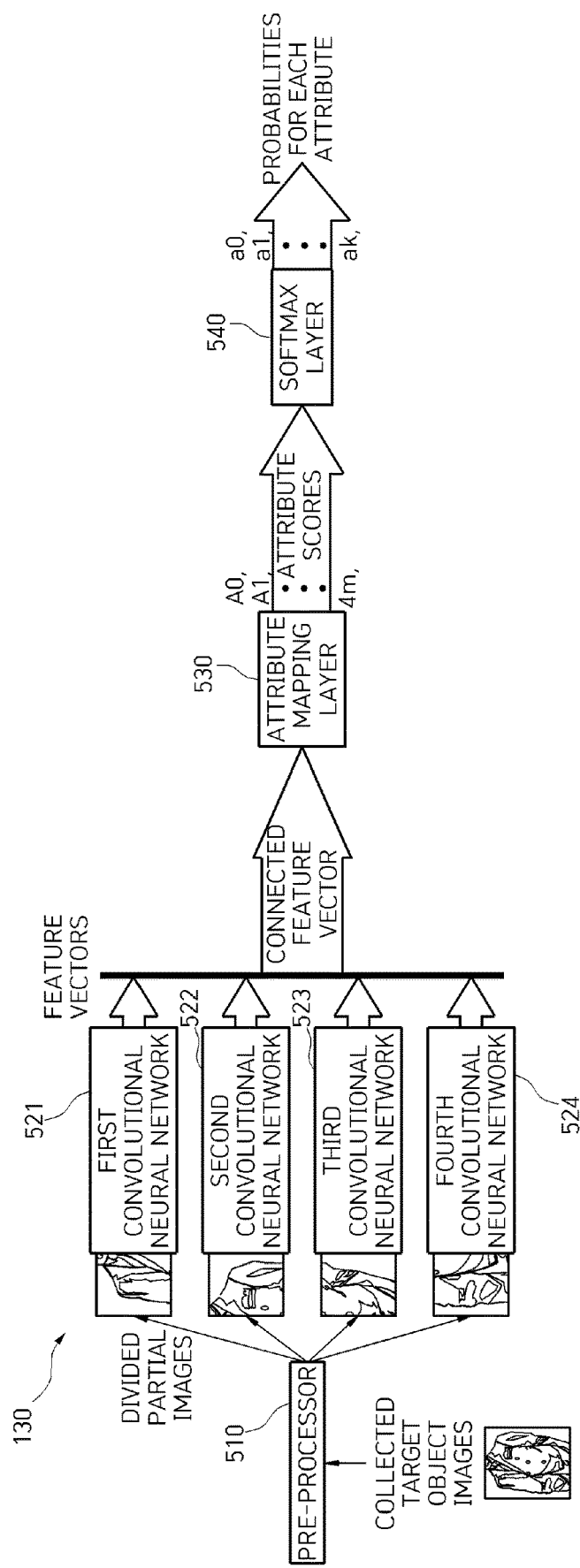
FIG. 5 is a block diagram illustrating an object attribute classification module in a fine adjustment operation and a classification operation according to an embodiment.

FIG. 5 is a block diagram illustrating the object attribute classification module in a fine adjustment operation and a classification operation according to an embodiment.

Referring to FIG. 5, the object attribute classification module 130 according to the embodiment may include a pre-processor 510, first to fourth convolutional neural networks 521, 522, 523, and 524, an attribute classification fully connected layer 530, and a SoftMax layer 540. The first to fourth convolutional neural networks 521, 522, 523, and 524 may correspond to the convolutional neural network 320 of FIG. 4.

The pre-processor 510 may obtain indexed target object images from a first memory (e.g., the first memory 110 of FIG. 1) and convert the indexed target object images to have a designated resolution. The pre-processor 510 may generate a first partial image, a second partial image, a third partial image, and a fourth partial image by dividing each of the converted target object image into quarters.

The first convolutional neural network 521 may receive the first partial image and calculate a feature vector of the first partial image through a convolution operation. The second convolutional neural network 522 may receive the second partial image and calculate a feature vector of the second partial image through a convolution operation. The third convolutional neural network 523 may receive the third partial image and calculate a feature vector of the third partial image through a convolution operation. The fourth convolutional neural network 524 may receive the fourth partial image and calculate a feature vector of the fourth partial image through a convolution operation. The first to fourth convolutional neural networks 521, 522, 523, and 524 may perform parallel processing (e.g., simultaneous processing) on the first to fourth partial images.

The feature vectors of the first to fourth partial images may be concatenated to form one vector (hereinafter, referred to as a connected feature vector).

The attribute classification fully connected layer 530 may map the connected feature vector to m attributes (m is the number of attributes to be classified) to output scores for each attribute. The attribute classification fully connected layer 530 is initialized when the object attribute classification module is constructed and may be, for example, a three-layer neural network.

The SoftMax layer 540 may map the scores for each attribute to probabilities for each attribute. Hereinafter, a fine adjustment method of the object attribute classification module 130 will be described in detail with reference to FIG. 6.

Figure 6:
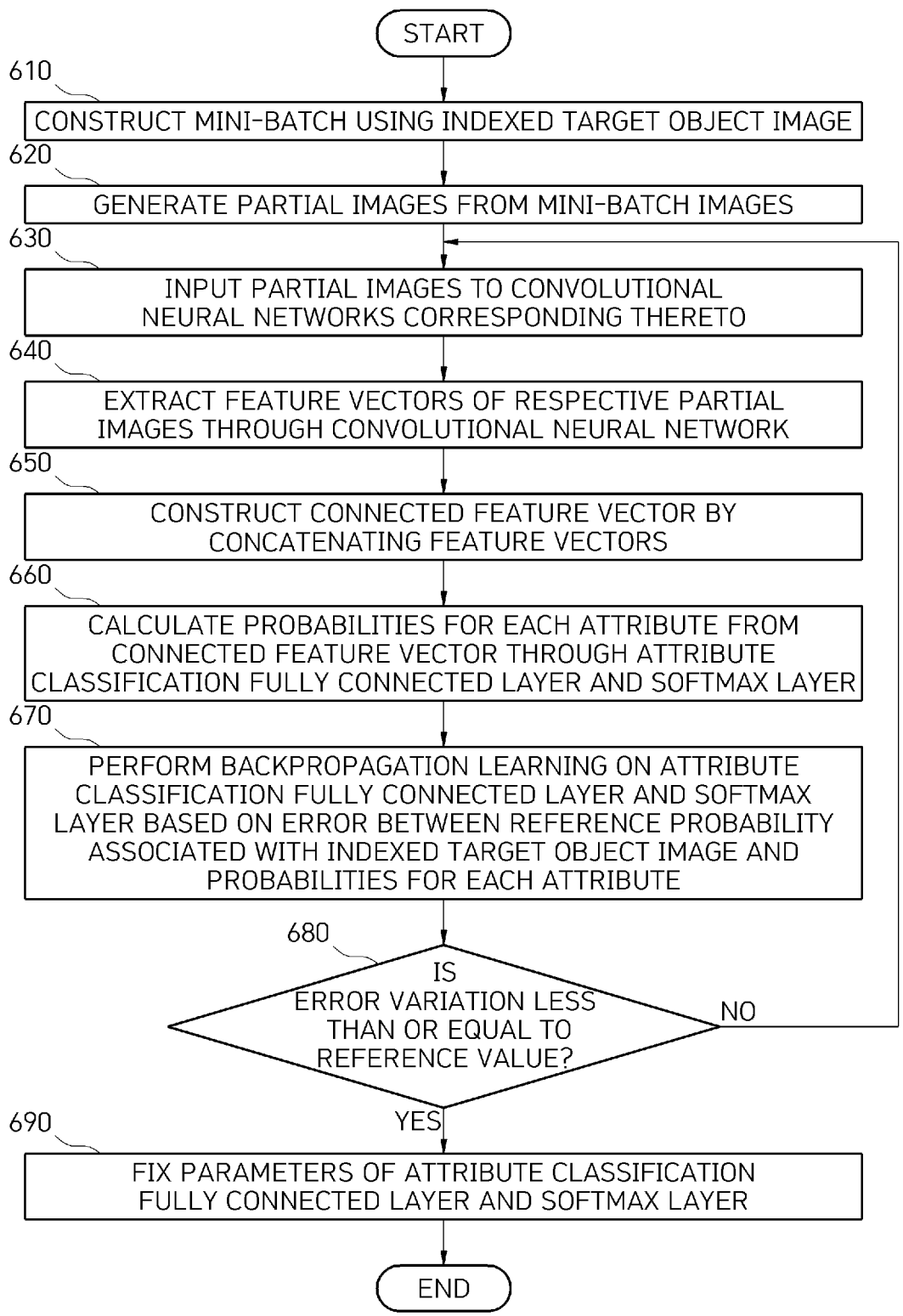
FIG. 6 is a detailed diagram illustrating a fine adjustment method by an object attribute classification module according to an embodiment.

FIG. 6 is a detailed diagram illustrating a fine adjustment method by the object attribute classification module according to an embodiment.

Referring to FIG. 6, in operation 610, the object attribute classification module 130 may generate a mini-batch after converting each indexed target object image to have a designated resolution.

In operation 620, the object attribute classification module 130 divides images of the mini-batch into first to fourth partial images and arranges the first to fourth partial images in a designated order, for example, in the order of the first partial image, the second partial image, the third partial image, and the fourth partial image.

In operation 630, the object attribute classification module 130 may input the first to fourth partial images to the first to fourth convolutional neural networks 521, 522, 523, and 524 corresponding respectively to the first to fourth partial images. For example, the object attribute classification module 130 may input the first partial image into the first convolutional neural network 521 generated by learning from the first partial image, may input the second partial image into the second convolutional neural network 522 generated by learning from the second partial image, may input the third partial image into the third convolutional neural network 523 generated by learning from the third partial image, and input the fourth partial image into the fourth convolutional neural network 524 generated by learning from the fourth partial image.

In operation 640, the object attribute classification module 130 may calculate feature vectors of each of the partial images through the first to fourth convolutional neural networks 521 to 524.

In operation 650, the object attribute classification module 130 may be concatenate the feature vectors in a designated order to form one connected feature vector.

In operation 660, the object attribute classification module 130 may calculate probabilities for each attribute through the attribute classification fully connected layer 530, and the SoftMax layer 540

In operation 670, the object attribute classification module 130 may perform backpropagation learning on the attribute classification fully connected layer 530 and the SoftMax layer 540 on the basis of the difference between attribute index data associated with the indexed target object image and the calculated probabilities for each attribute. For example, the object attribute classification module 130 may calculate the difference between the attribute index data associated with the indexed target object image and the probabilities for each attribute calculated through an error calculator as an error, and may perform backpropagation learning on the attribute classification fully connected layer 530 and the SoftMax layer 540 on the basis of the calculated error.

In operation 680, the object attribute classification module 130 may check whether a variation (an error variation) of the errors calculated for each of the indexed target object images is less than or equal to a reference value.

The object attribute classification module 130, upon determining in operation 680 that the error variation is less than or equal to the reference, may fix parameters of the attribute classification fully connected layer 530 and the SoftMax layer 540 in operation 690. On the other hand, the object attribute classification module 130, upon determining that the error variation exceeds the reference value in operation 680, may return to operation 630 and may perform subsequent operations again.

According to the above-described embodiment, the object attribute classification module 130 may precisely adjust the classifier, which is constructed on the basis of unsupervised learning of selected target object images, by performing supervised learning on the classifier on the basis of indexed target object images. Accordingly, with the above-described embodiment, the object attribute classification module 130 may construct a precise classifier on the basis of a small amount of indexed target object images.

Figure 7:
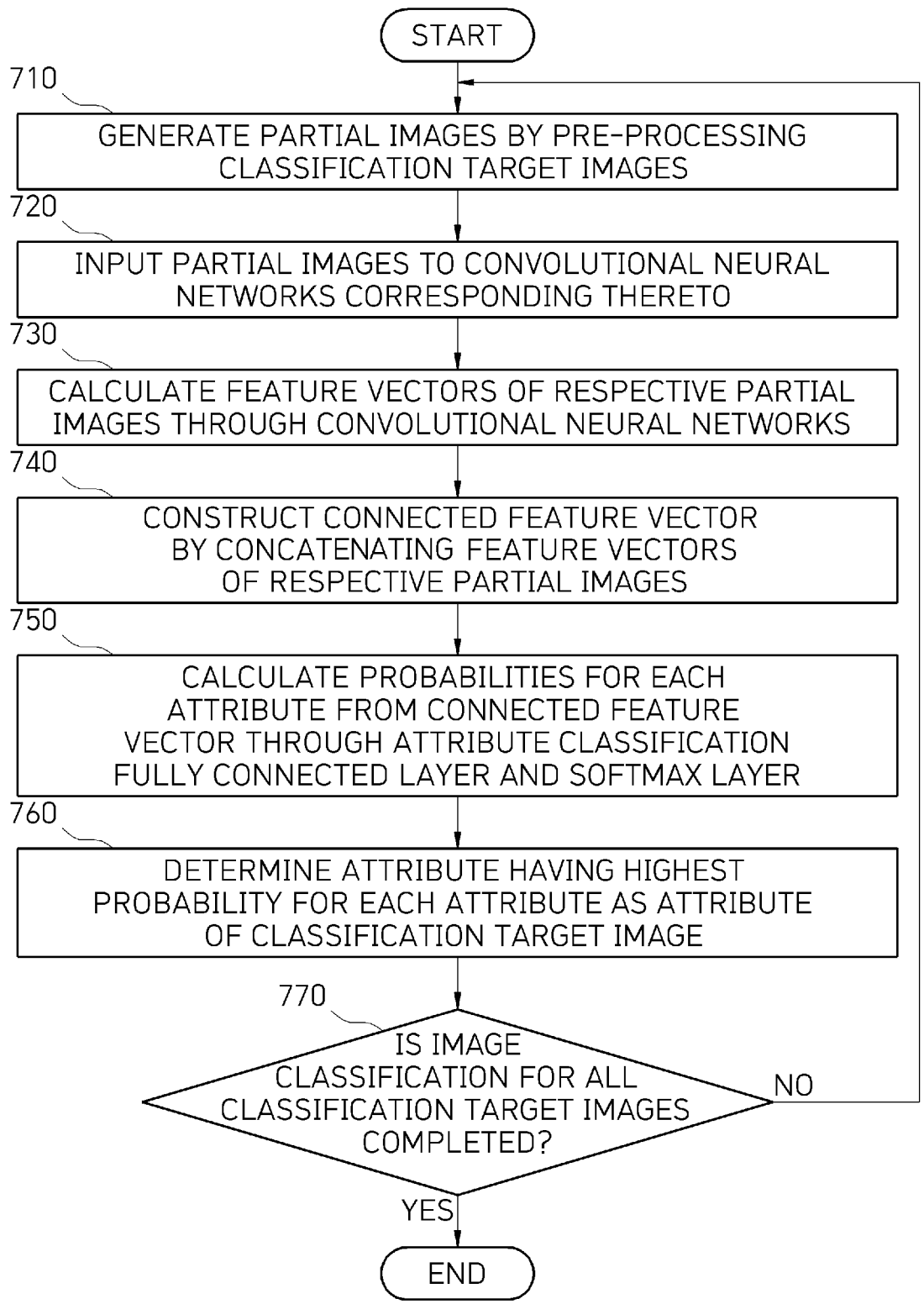
FIG. 7 is a diagram illustrating an object attribute classification method by an object attribute classification module according to an embodiment.

FIG. 7 is a diagram illustrating an object attribute classification method by the object attribute classification module according to an embodiment.

Referring to FIG. 7, in operation 710, the object attribute classification module 130 may generate first to fourth partial images by pre-processing classification target images. The object attribute classification module 130 may generate first to fourth partial images for one classification target image.

In operation 720, the object attribute classification module 130 may input the first to fourth partial images to the first to fourth convolutional neural networks 521, 522, 523 and 524 corresponding respectively thereto.

In operation 730, the object attribute classification module 130 may calculate feature vectors of each of the partial images through the first to fourth convolutional neural networks 521, 522, 523, and 524.

In operation 740, the object attribute classification module 130 may calculate a connected feature vector by concatenating the calculated feature vectors in a designated order.

In operation 750, the object attribute classification module 130 may calculate probabilities for each attribute with respect to the classification target image through the attribute classification fully connected layer 530 and the SoftMax layer 540.

In operation 760, the object attribute classification module 130 may determine an attribute having the highest probability for each attribute as the attribute (or the class) of the classification target image. The object attribute classification module 130 may output the determined attribute of the classification target image through an output device (e.g., the output device 170 of FIG. 1).

In operation 770, the object attribute classification module 130 may check whether image classification for all the classification target images is completed. Upon determination as a result of the checking that image classification for all the classification target images is completed, the object attribute classification module 130 may terminate the classification process. On the other hand, upon determination as a result of the comparison that image classification for all the classification target images has not been completed, the object attribute classification module 130 may return to operation 710 and perform operations 710 to 770 on other classification target images.

Hereinafter, another embodiment of the object attribute classification model described in FIGS. 5 to 7 will be described with reference to FIGS. 8 to 10.

Figure 8:
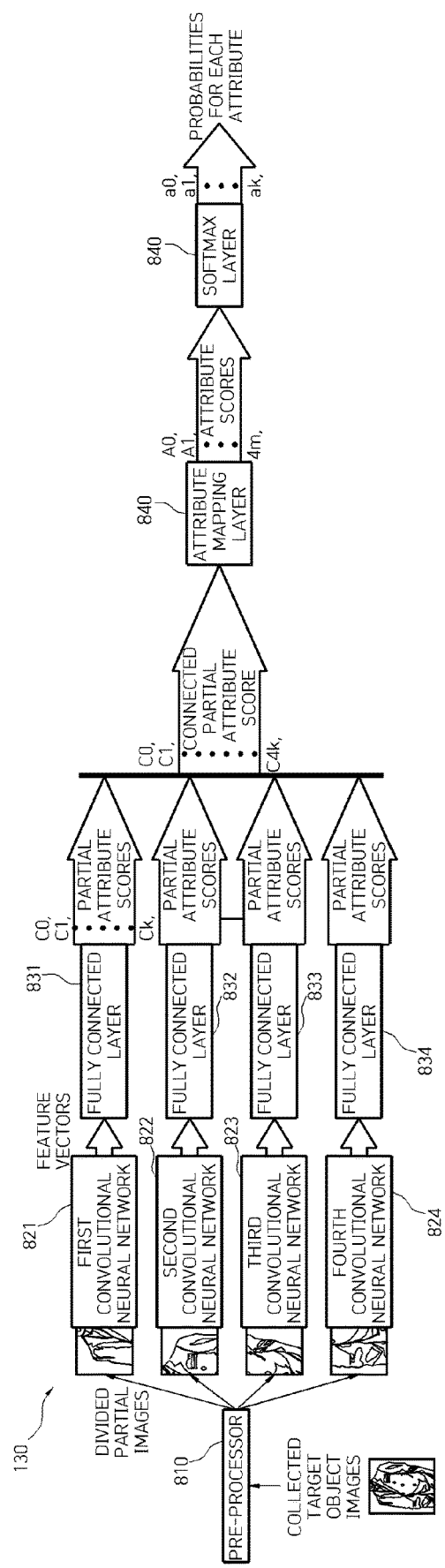
FIG. 8 is a block diagram illustrating an object attribute classification module in a fine adjustment operation and a classification operation according to another embodiment of the present invention.

FIG. 8 is a block diagram illustrating an object attribute classification module in a fine adjustment operation and a classification operation according to another embodiment of the present invention.

Referring to FIG. 8, the object attribute classification module 130 according to the embodiment includes a pre-processor 810, first to fourth convolutional neural networks 821, 822, 823, and 824, first to fourth fully-connected layers 831, 832, 833, and 834, an attribute mapping layer 840, and a SoftMax layer 850. The first to fourth convolutional neural networks 821, 822, 823, and 824 may correspond to the convolutional neural network 320 of FIG. 4. The first to fourth fully connected layers 831, 832, 833, and 834 may correspond to the fixed fully-connected layer 330 of FIG. 4. The first to fourth convolutional neural networks 821, 822, 823, and 824 and the first to fourth fully-connected layers 831, 832, 833, and 834 before fine adjustment may correspond to the classifier generated by supervised learning from target object images shown in FIGS. 3 and 4.

The pre-processor 810 may obtain indexed target object images from a first memory (e.g., the first memory 110 of FIG. 1) and convert the obtained target object images to have a designated resolution. The pre-processor 810 may generate a first partial image, a second partial image, a third partial image, and a fourth partial image by dividing each of the converted target object images into quarters.

The first to fourth convolutional neural networks 821, 822, 823, 824 receive the first to fourth partial images corresponding respectively thereto, and calculate feature vectors of the first to fourth partial images through convolution operations, respectively. The first to fourth convolutional neural networks 821, 822, 823, and 824 may perform parallel processing (e.g., simultaneous processing) on the first to fourth partial images.

The first fully-connected layer 831 may map the feature vector of the first partial image to a first cluster-specific score. The second fully-connected layer 832 may map the feature vector of the second partial image to a second cluster-specific score. The third fully-connected layer 833 may map the feature vector of the third partial image to a third cluster-specific score. The fourth fully-connected layer 834 may map the feature vector of the fourth partial image to a fourth cluster-specific scores. The first to fourth fully-connected layers 831, 832, 833, and 834 may perform parallel processing (e.g., simultaneous processing) on the first to fourth partial images. The feature vectors of the first to fourth partial images may be concatenated to form one vector (hereinafter, a connected feature vector).

The attribute mapping layer 840 may map the connected feature vector to m attributes (m is the number of attributes to be classified) to output scores for each attribute. The attribute mapping layer 840 is initialized when the object attribute classification module is constructed and may be, for example, a three-layer neural network.

The SoftMax layer 850 may map scores for each attribute to probabilities for each attribute. Hereinafter, a fine adjustment method of the object attribute classification module 130 will be described in detail with reference to FIG. 9.

FIG. 9 shows a detailed fine-adjustment method by the object attribute classification module according to another embodiment of the present invention.

Referring to FIG. 9, in operation 910, the object attribute classification module 130 may generate a mini-batch after converting each of the indexed target object images to have a designated resolution.

In operation 920, the object attribute classification module 130 may divide the images of the mini-batch into first to fourth partial images and arrange the first to fourth partial images in a designated order, for example, in the order of the first partial image, the second partial image, the third partial image, and the fourth partial image. The object attribute classification module 130 may construct the first to fourth partial images corresponding to one indexed target object image into one mini-batch set.

In operation 930, the object attribute classification module 130 may input the first to fourth partial images into the first to fourth convolutional neural networks 821, 822, 823, and 824 corresponding respectively thereto.

In operation 940, the object attribute classification module 130 may calculate partial attribute scores of respective partial images through the first to fourth convolutional neural networks 821, 822, 823, and 824 and the first to fourth fully-connected layers 831, 832, 833, and 834. Feature vectors of the respective partial images may be calculated through the neural networks.

In operation 950, the object attribute classification module 130 may concatenate the feature vectors in a designated order to form one connected feature vector.

In operation 960, the object attribute classification module 130 may calculate probabilities for each attribute through the attribute mapping layer 840 and the SoftMax layer 850.

In operation 970, the object attribute classification module 130 performs backpropagation on the attribute mapping layer 840 and the SoftMax layer 850 on the basis of the difference between attribute index data associated with the indexed target object image and the calculated probabilities for each attribute. For example, the object attribute classification module 130 may calculate a difference between the attribute index data associated with the indexed target object image and the calculated probabilities for each attribute through an error calculator as an error and may perform backpropagation learning on the attribute mapping layer 840 and the SoftMax layer 850 on the basis of the calculated error.

In operation 980, the object attribute classification module 130 may check whether a variation (an error variation) of the errors calculated for the respective indexed target object images is less than or equal to a reference value.

Upon determining in operation 980 that the error variation is less than or equal to the reference value, the object attribute classification module 130 may fix the parameters of the attribute mapping layer 840 and the SoftMax layer 850 in operation 990. On the other hand, upon determining in operation 980 that the error variation exceeds the reference value, the object attribute classification module 130 may return to operation 930 and may perform subsequent operations again.

According to the above-described embodiment, the object attribute classification module 130 may finely adjust the classifier, which is constructed on the basis of unsupervised learning of selected target object images, by performing supervised learning on the classifier on the basis of indexed target object images. Accordingly, with the above-described embodiment, the object attribute classification module 130 may construct a precise classifier on the basis of a small amount of indexed target object images.

FIG. 10 illustrates an object attribute classification method by the object attribute classification module according to another embodiment of the present invention.

Referring to FIG. 10, in operation 1010, the object attribute classification module 130 may generate first to fourth partial images by pre-processing classification target images. The object attribute classification module 130 may generate the first to fourth partial images for one classification target image.

In operation 1020, the object attribute classification module 130 may input the first to fourth partial images to the first to fourth convolutional neural networks 821, 822, 823, and 824 corresponding respectively to the first to fourth partial images.

In operation 1030, the object attribute classification module 130 may calculate feature vectors of the respective partial image through the first to fourth convolutional neural networks 821, 822, 823, and 824.

In operation 1040, the object attribute classification module 130 may calculate a connected feature vector by concatenating the calculated feature vectors in a designated order.

In operation 1050, the object attribute classification module 130 may calculate probabilities for each attribute with respect to the classification target image through the attribute mapping layer 840 and the SoftMax layer 850.

In operation 1060, the object attribute classification module 130 may determine an attribute having the highest probability for each attribute as the attribute (or the class) of the classification target image. The object attribute classification module 130 may output the determined attribute of the classification target image through an output device (e.g., the output device 170 of FIG. 1).

In operation 1070, the object attribute classification module 130 may check whether image classification for all classification target images is completed. Upon determination as a result of the checking that image classification for all the classification target images is completed, the object attribute classification module 130 may terminate the classification process. On the other hand, upon determination as a result of the comparison that image classification for all the classification target images has not been completed, the object attribute classification module 130 may return to operation 1010 and perform operations 1010 to 1070 on other classification target images.

FIG. 11 illustrates an object attribute classification method according to an embodiment. Various operations in the flowchart of FIG. 11 may be performed in the order shown in the drawing, in a reverse order, or concurrently performed. In addition, according to some embodiments, some operations, blocks, operations, or equivalents thereto may have various modification, such as omission, addition, correction, or skipping without departing from the scope of the embodiments disclosed herein. For example, operations 1120 to 1130 may be performed by other devices. In this case, operations 1120 to 1130 may be replaced with an operation of storing un-indexed target object images.

Referring to FIG. 11, in operation 1110, the apparatus 100 for classifying an attribute of an image object may store indexed target object images. The process of indexing target object images may be performed by a user as a process separate from the construction of a classifier according to the disclosure.

In operation 1120, the apparatus 100 for classifying an attribute of an image object may collect images for learning by web crawling a designated web site.

In operation 1130, the apparatus 100 for classifying an attribute of an image object may select target object images including a target object among the collected images. For example, the apparatus 100 for classifying an attribute of an image object may select target object images from collected images using the object selecting module 125 configured in advance on the basis of indexed target object images.

In operation 1140, the apparatus 100 for classifying an attribute of an image object may construct a classifier capable of classifying detailed attributes of the target object by performing unsupervised learning on the selected target object images. In this regard, the apparatus 100 for classifying an attribute of an image object may perform unsupervised learning by dividing the selected target object images. The apparatus 100 for classifying an attribute of an image object may calculate feature vectors of all the selected target object images on the basis of a convolutional neural network and calculate cluster centers on the basis of all the feature vectors. The apparatus 100 for classifying an attribute of an image object may construct the classifier by performing backpropagation learning using cluster information of some target object images according to the cluster centers as a reference vector.

In operation 1150, the apparatus 100 for classifying an attribute of an image object may finely adjust the classifier by performing supervised learning on the indexed target object images.

According to the various embodiments of the disclosure, a classifier for classification of an attribute of an image object, which requires considerable expertise, can be constructed on the basis of a large amount of un-indexed data and a small amount of indexed data while utilizing a pre-trained public convolutional neural network structure. In addition, various effects directly or indirectly identified through the disclosure can be provided.

The various embodiments of the disclosure and terminology used herein are not intended to limit the technical features of the disclosure to the specific embodiments, but rather should be understood to cover all modifications, equivalents, and alternatives falling within the spirit and scope of the invention. In the description of the drawings, like numbers refer to like elements throughout the description of the drawings. The singular forms preceded by "a," "an," and "the" corresponding to an item are intended to include the plural forms as well unless the context clearly indicates otherwise. In the disclosure, a phrase such as "A or B," "at least one of A and B," "at least one of A or B," "A, B or C," "at least one of A, B and C," and "at least one of A, B, or C" may include any one of the items listed together in the corresponding phrase of the phrases, or any possible combination thereof. Terms, such as "first," "second," etc. are used to distinguish one element from another and do not modify the elements in other aspects (e.g., importance or sequence). When one (e.g., a first) element is referred to as being "coupled" or "connected" to another (e.g., a second) element with or without the term "functionally" or "communicatively," it means that the one element is connected to another element directly (e.g., wired), wirelessly, or via a third element.

As used herein, the terms "module" and "unit" may include units implemented in hardware, software, or firmware and may be interchangeably used with terms such as logic, logic blocks, components, or circuits. The module may be an integrally configured component or a minimum unit or part of the integrally configured component that performs one or more functions. For example, according to one embodiment, the module may be implemented in the form of an application-specific integrated circuit (ASIC).

The various embodiments of the disclosure may be realized by software (e.g., a program) including one or more instructions stored in a storage medium (e.g., an internal memory or external memory) (the first memory 110) that can be read by a machine (e.g., the apparatus 100 for classifying an attribute of an image object 100). For example, a processor (e.g., the first to fourth convolution neural networks 521 to 524, and 821 to 824, the first to fourth fully connected layers 831 to 834, the attribute classification fully connected layer 530, and the soft max layers 550 and 850) of the machine (e.g., the apparatus 100 for classifying an attribute of an image object) may invoke and execute at least one instruction among the stored one or more instructions from the storage medium. Accordingly, the machine operates to perform at least one function in accordance with the invoked at least one command. The one or more instructions may include codes generated by a compiler or codes executable by an interpreter. The machine-readable storage medium may be provided in the form of a non-transitory storage medium. Here, when a storage medium is referred to as "non-transitory," it can be understood that the storage medium is tangible and does not include a signal (for example, electromagnetic waves), but rather that data is semi-permanently or temporarily stored in the storage medium.

According to one embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed directly between two user devices (e.g., smartphones) through an application store (e.g., Play Store™), or online (e.g., downloaded or uploaded). In the case of online distribution, at least a portion of the computer program product may be stored at least semi-permanently or may be temporarily generated in a machine-readable storage medium, such as a memory of a server of a manufacturer, a server of an application store, or a relay server.

According to the various embodiments, each of the above-described elements (e.g., a module or a program) may include a singular or plural entity. According to various embodiments, one or more of the above-described elements or operations may be omitted, or one or more other elements or operations may be added. Alternatively or additionally, a plurality of elements (e.g., modules or programs) may be integrated into one element. In this case, the integrated element may perform one or more functions of each of the plurality of elements in the same or similar manner as that performed by the corresponding element of the plurality of components before the integration. According to various embodiments, operations performed by a module, program, or other elements may be executed sequentially, in parallel, repeatedly, or heuristically, or one or more of the operations may be executed in a different order, or omitted, or one or more other operations may be added.

What is claimed is:

1. An apparatus for classifying an attribute of an image object, comprising:
   a first memory configured to store target object images that are indexed;
   a second memory configured to store target object images that are un-indexed; and
   an object attribute classification module configured to perform learning on the un-indexed target object images to construct a classifier for classifying a detailed attribute of target object and finely adjust the classifier on the basis of the indexed target object images,
   wherein the second memory includes:
   a data collection module configured to collect images for learning from a designated web site; and
   an object selecting module configured to select the target object images from the collected images on the basis of a similarity between the indexed target object images and the collected images and store the selected target object images.

2. The apparatus of claim 1, wherein the object attribute classification module is configured to:
   calculate feature vectors of each of the un-indexed target object images;
   cluster the feature vectors to calculate a cluster center;
   perform random selection on some target object images among the un-indexed target object images to construct a training batch;
   calculate partial attribute probabilities on the basis of feature vectors of the training batch;
   calculate cluster information of the feature vectors of the training batch on the basis of the calculated cluster center; and
   perform backpropagation learning from a difference between the partial attribute probabilities and the cluster information, to construct the classifier.

3. The apparatus of claim 2, wherein the object attribute classification module is configured to:
   divide each of the selected target object images by a designated unit to generate a plurality of partial images; and
   calculate the feature vectors, the cluster center, the partial attribute probabilities, and the cluster information on the basis of the plurality of partial images.

4. The apparatus of claim 2, wherein the object attribute classification module constructs the classifier such that a variation of differences calculated for each of the selected target object images is less than or equal to a reference value.

5. The apparatus of claim 1, wherein the object attribute classification module is configured to:
   calculate feature vectors of the indexed target object images;
   connect the calculated feature vectors;
   calculate probabilities for each attribute on the basis of the connected feature vector; and
   perform backpropagation learning on an attribute mapping layer and a soft-max layer from a difference between an attribute index data associated with the indexed target object image and the probabilities for each attribute so as to finely adjust the classifier.

6. The apparatus of claim 5, wherein the object attribute classification module is configured to:
   divide each of the indexed target object images by a designated unit to generate a plurality of partial images; and
   calculate the feature vectors, the connected feature vector, and the probabilities of each attribute on the basis of the plurality of partial images.

7. The apparatus of claim 6, wherein the object attribute classification module is configured to:
   perform parallel processing on a plurality of partial images corresponding to each of the indexed target object images through a plurality of convolutional neural networks and a plurality of fully-connected layers to calculate feature vectors and a connected feature vector corresponding to each of the indexed target object images;
   calculate scores for each attribute according to the connected feature vector through an attribute classification fully connected layer; and
   map the scores for each attribute to the probabilities for each attribute through a soft-max layer.

8. The apparatus of claim 5, wherein the object attribute classification module finely adjusts the classifier such that a variation of differences calculated for each of the indexed target object images is less than or equal to a reference value.

9. The apparatus of claim 1, wherein the object attribute classification module is configured to:
   calculate feature vectors of the indexed target object images;
   calculate partial attribute scores on the basis of the calculated feature vectors;
   calculate probabilities for each attribute on the basis of the partial attribute scores; and
   perform backpropagation learning on an attribute mapping layer and a soft-max layer from a difference between an attribute index data associated with the indexed target object image and the probabilities for each attribute so as to finely adjust the classifier.

10. An apparatus for classifying an attribute of an image object, comprising:
    a memory configured to store at least one instruction; and
    a processor,
    wherein the processor is configured to execute the at least one instruction to:
    perform unsupervised learning on target object images, which are un-indexed, to construct a classifier for classifying a detailed attribute of the target object image; and
    finely adjust the classifier on the basis of target object images which are indexed,
    wherein the processor,
    collecting images for learning from a designated web site; and
    selecting the target object images from the collected images on the basis of a similarity between the indexed target object images and the collected images and storing the selected target object images.

11. The apparatus of claim 10, wherein the processor is configured to:
    divide each of the un-indexed target object images or each of the indexed target object images by a designated unit to generate a plurality of partial images; and sequentially perform unsupervised learning and supervised learning on the plurality of partial images to construct or finally adjust the classifier.

12. The apparatus of claim 10, wherein the processor is configured to:
calculate feature vectors of each of the un-indexed target object images;
cluster the feature vectors to calculate a cluster center;
perform random selection on some target object images among the un-indexed target object images to construct a training batch;
calculate partial attribute probabilities on the basis of feature vectors of the training batch;
calculate cluster information of the feature vectors of the training batch on the basis of the calculated cluster center; and
perform backpropagation learning from a difference between the partial attribute probabilities and the cluster information so as to construct the classifier.

13. The apparatus of claim 12, wherein the processor constructs the classifier such that a variation of differences calculated for each of the training batches is less than or equal to a reference value.

14. The apparatus of claim 10, wherein the processor is configured to:
calculate feature vectors of the indexed target object images;
calculate partial attribute scores on the basis of the calculated feature vectors;
calculate probabilities for each attribute on the basis of the partial attribute scores; and
perform backpropagation learning on an attribute mapping layer and a soft-max layer from a difference between an attribute index data associated with the indexed target object image and the probabilities for each attribute so as to finely adjust the classifier.

15. The apparatus of claim 14, wherein the processor finely adjusts the classifier such that a variation of differences calculated for each of the indexed target object images is less than or equal to a reference value.

16. A method of classifying an attribute of an image object using an apparatus for classifying an attribute of an image object, the method comprising:
storing target object images that are indexed;
storing target object images that are un-indexed;
performing un-supervised learning on the un-indexed target object images to construct a classifier for classifying a detailed attribute of target object; and
performing supervised learning on the indexed target object images to finely adjust the classifier,
wherein the construction and adjustment of the classifier are performed based on a plurality of partial images obtained by dividing each of the un-indexed target object images or each of the indexed target object images by a designated unit.

17. The method of claim 16, wherein the construction of the classifier includes:
calculating feature vectors of each of the un-indexed target object images;
clustering the feature vectors to calculate a cluster center;
performing random selection on the un-indexed target object images to construct a training batch;
calculating an attribute probability on the basis of feature vectors of the training batch;
calculating cluster information of the feature vectors of the training batch on the basis of the calculated cluster center; and
performing backpropagation learning from a difference between the attribute probability and the cluster information so as to construct the classifier.

18. The method of claim 16, wherein the adjustment of the classifier includes:
calculating feature vectors of the indexed target object images;
calculating partial attribute scores on the basis of the calculated feature vectors;
calculating probabilities for each attribute on the basis of the partial attribute scores; and
performing backpropagation learning on an attribute mapping layer and a soft-max layer from a difference between an attribute index data associated with the indexed target object image and the probabilities for each attribute, to finely adjust the classifier.

* * * * *